(12) United States Patent
Allison et al.

(10) Patent No.: US 8,473,374 B2
(45) Date of Patent: Jun. 25, 2013

(54) METHOD AND APPARATUS FOR MONITORING INVENTORY

(75) Inventors: Chris Allison, Frisco, TX (US);
Kuntesh R. Chokshi, Plano, TX (US);
Allen Fosha, Firsco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 727 days.

(21) Appl. No.: 12/347,075

(22) Filed: Dec. 31, 2008

(65) Prior Publication Data

US 2010/0169189 A1      Jul. 1, 2010

(51) Int. Cl.
*G06Q 40/00* (2012.01)

(52) U.S. Cl.
USPC .......................................................... 705/28

(58) Field of Classification Search
USPC .......................................................... 705/28
See application file for complete search history.

(56) References Cited

U.S. PATENT DOCUMENTS

| | | | |
|---|---|---|---|
| 4,509,123 A | 4/1985 | Vereen | |
| 5,439,120 A | 8/1995 | Brozak | |
| 6,349,244 B1 | 2/2002 | Bardin et al. | |
| 2003/0030539 A1 | 2/2003 | McGarry et al. | |
| 2003/0138129 A1 | 7/2003 | Olson et al. | |
| 2004/0158353 A1* | 8/2004 | Poterek et al. | 700/244 |
| 2005/0131578 A1* | 6/2005 | Weaver | 700/244 |
| 2005/0168345 A1 | 8/2005 | Swafford, Jr. et al. | |
| 2006/0267730 A1 | 11/2006 | Steinke et al. | |
| 2009/0032482 A1 | 2/2009 | Battaglia | |
| 2009/0248198 A1* | 10/2009 | Siegel et al. | 700/231 |

OTHER PUBLICATIONS

Metzger, Christian, et al., "Flexible-Foam-Based Capacitive Sensor Arrays for Object Detection at Low Cost", Applied Physics Letters, vol. 92, 013506-1-013506-3, 2008, p. 92.
http://www.edmundoptics.com, "Application Notes", E008-11 Primer, Dec. 17, 2000, pp. 8-25.
"NI Vision, IMAQ Vision Concepts Manual", National Instruments, Jan. 2005, 374 pages.

* cited by examiner

*Primary Examiner* — Shay S Glass
(74) *Attorney, Agent, or Firm* — Bobby W. Braxton; Colin P. Cahoon; Carstens & Cahoon, LLP

(57) ABSTRACT

A method for monitoring inventory on a self-adjusting shelf and apparatus for accomplishing the same. The invention describes a method for determining the number of packages on a shelf or hanger of a self-adjusting shelf. The number of packages on a shelf or hanger are determined by measuring the distance from the back end of a shelf to the package closest to the shelf with a sensor, ascertaining the thickness of the product, and by calculating the amount of space occupied on a shelf or hanger and consequently the number of packages on a shelf. In another embodiment, the product is identified by a product identifying means such as an SKU reader. Thus, the quantity and type of product located on a shelf or hanger is known. Such information allows a store to know the type and quantity of packages needed to restock a specific hanger.

35 Claims, 4 Drawing Sheets

METHOD AND APPARATUS FOR MONITORING INVENTORY

BACKGROUND OF THE INVENTION

1. Technical Field

The present invention relates to a method and apparatus for monitoring product inventory.

2. Description of Related Art

Food products and other products are typically sold via shelves or hangers. The product is arranged so that the consumer can easily see and remove the desired package or good. Maintaining product inventory in stock typically requires a person to physically check the store shelves or hangers to maintain inventory and display appearance, which can create inefficiencies by way of repeated trips to monitor and/or restock inventory and of the potential for presenting the consumer with empty or nearly empty shelves. Increasing the efficiency of these trips by knowing which products need to be replenished and when would decrease the number of trips necessary to restock a retail store. Furthermore, currently the restocking personnel must carry excess product quantities and varieties as it is never known how much of each product variety will be needed to replenish a specific retail store or a specific shelf in a retail store.

Consequently, it is desirable to have an inventory monitoring system which provides real time accounting of the product on each shelf. Furthermore, it is desirable that the monitoring system be capable of identifying the type of product on the shelf so that both the product type and quantity of product on a shelf can be known. Finally, it is desirable that the monitoring system be cost effective to maximize the return on investment and profit.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures.

Generally, this invention relates to a method and apparatus for monitoring inventory on a shelf in real time. Specifically, this invention may be utilized on a self-adjusting shelf. As used herein a "self-adjusting shelf" refers to any shelf or hanger which automatically moves the product to the front of the shelf or hanger. The self-adjusting shelf, just as other shelves, comprises a top, a bottom, a front end, and a back end. In addition, the self-adjusting shelf comprises at least one product support. As used herein "product support" refers to the shelf upon which product sits, the hangers from which product hangs, and any other device which supports product.

In many embodiments the product support lies approximately perpendicular to the vertical orientation of the self-adjusting shelf. Further, the self-adjusting shelf comprises a means for moving the product to the front of the shelf. In some embodiments gravity provides the means for moving the product, and accordingly, no moving parts are necessary. In other embodiments a rotating screw, a spring, or other such means provides the necessary force to move the product to the front of the shelf.

One example of a self-adjusting shelf is a spring loaded shelf which, upon removal of a first product exerts force upon the second product so that the second product assumes the previous position of the first product. Likewise, a rotating screw or other such means provides the force necessary to move the product. These means are typically utilized to position product in a vending machine.

Another example is an inclined plane shelf whereby the shelves are slanted such that when one product is removed, gravity forces the second product to replace the removed product. Such shelves are typically used, for example, to dispense soda cans whereby once the force opposing the downward force of gravity is removed, i.e. the first can, the second can is pulled via gravity to replace the removed can. These inclined planes may additionally have dividers which create separate lanes.

Another type of self-adjusting shelf, for which this invention is ideally suited, is a gravity feed hanger. An example of a gravity feed hanger is depicted in U.S. application Ser. No. 11/832,346 which is fully incorporated herein by reference.

Figure 1:
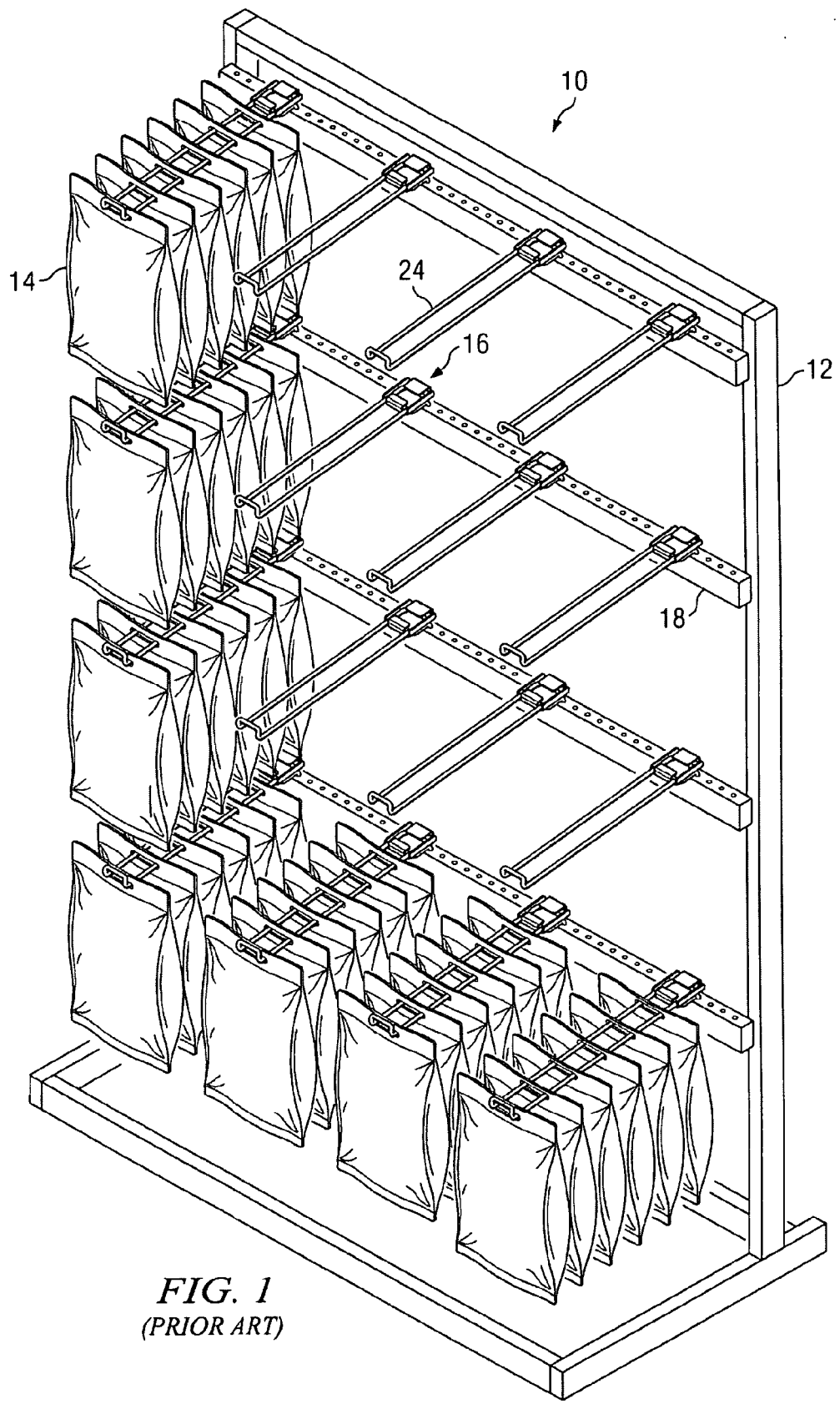
FIG. 1 is a perspective view of a gravity feed hanging system.

FIG. 1 is a perspective front view of a gravity feed system according to one embodiment of the present disclosure. The gravity feed system 10 includes a display apparatus 12, upon and from which a multitude of packages 14 may be displayed and dispensed, respectively. The packages 14 are supported by multiple gravity feed hanger assemblies 16, which are in turn supported by crossbeams 18. The hangers 24 are attached to the hanger assemblies 16. Thus, in the depicted gravity feed system 10, the hangers 24 are the product supports. In one embodiment the gravity feed system 10 comprises at least one product support having sufficient capacity for a plurality of packages. In one embodiment the product support has sufficient capacity for at least five packages.

Although the packages 14 depicted in the Figures includes average-sized flex-bags, which are most commonly suited to the marketing of snack foods, the self-adjusted shelf of the instant invention can be used to store and dispense other items packaged in bags, boxes, traditional pillow pouches, packages which stand upright or other similar containers.

Figure 3:
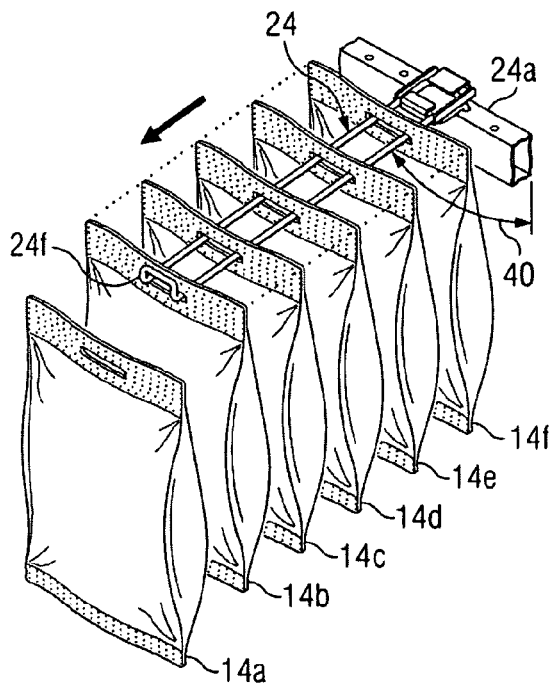

As shown in FIG. 1, in one embodiment, the packages 14 engage the gravity feed hanger assembly 16 via a slot 20 formed in the package tab 22 (as shown in FIG. 3). In other embodiments, this engagement can be obtained through the use of a non-integral tab added to the packages 14 prior to placement of the packages 14 on the gravity feed hanger assembly 16. In still further embodiments, the packages 14 may comprise an integral or attached hook for engaging the gravity feed hanger assembly 16.

Figure 2:
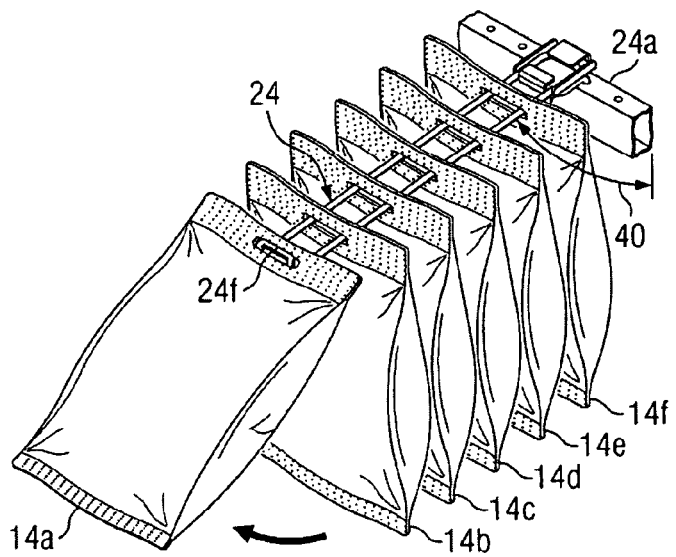
FIGS. 2-4 are perspective views, in series, of the removal of the product and the operation of the gravity feed system of FIG. 1.
Figure 4:
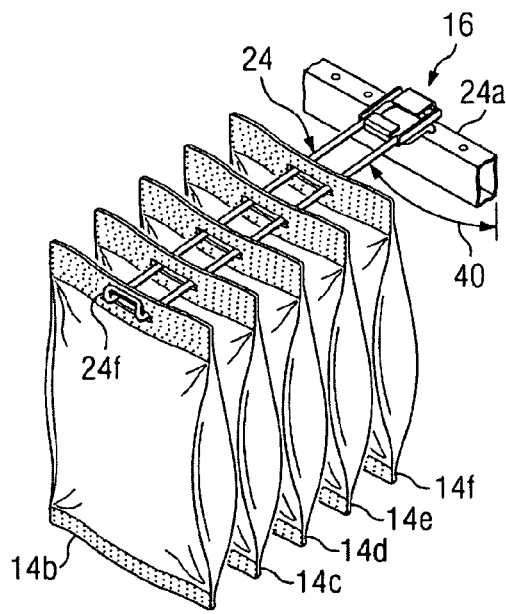

FIGS. 2-4 are perspective views, in series, of the removal of the product and the operation of the gravity feed system of FIG. 1. As seen in FIG. 2, the hanger 24 is supported at an angle 40, as measured from the vertical. This angle 40 may be adjusted due to frictional forces exerted by the hanger 24 and the packages 14a-14f, and those skilled in the art armed with the instant disclosure will be able to determine the desirable angles. In one embodiment the hanger 24 is sloped at an angle 40 less than about 90°. Due to this downward angle, the weight of the packages 14 tends to pull the packages 14 down the length of the hanger 24, absent sufficient friction between the package tab 22 and the hanger 24 to prevent slippage. In some embodiments, the hanger 24 may be powder-coated or otherwise treated with a friction-reducing product so as to facilitate the movement of the packages 14 along the hanger 24.

Despite the force exerted on the package 14 by its own weight, the lip 24*f* prevents the uncontrolled dispensing of packages 14 by halting the progress of the foremost item of packages 14 at the dispensing end 24*b* of the hanger 24. The lip 24*f*, in one embodiment, is long enough to set at an angle sufficient to prevent the hanging stock 14 from being propelled off of the end of the hanger 24 by the force of its own weight, in combination with the cumulative weight of any of the packages 14 that may be trailing behind it.

Controlled dispensing of the package 14 is performed by the manual removal of the foremost package 14*a*. In the embodiment illustrated in FIGS. 2-4, a foremost item 14*a* must be manipulated by the individual removing it so that it is pulled both outward and upward, clearing the lip 24*f*. As the item 14*a* vacates its position at the bottom of the hanger 24, the second package 14*b*, no longer impeded by the obstructing leading package 14*a*, is urged by its own weight to the end of the hanger 24 and is halted by the lip 24*f*. Thus, what was previously the second package now becomes the leading package. The remaining packages 14*c*-14*f* similarly move down the hanger 24, until each of the packages 14*c*-14*f* is halted by the item in front of it, so that the length of the hanger 24 nearest the loading end 24*a* is vacated. As the remaining packages 14*b-f* are similarly removed from the hanger 24, the space between the package 14*f* and the latch 26 increases until, finally, the last package 14*f* is removed and the hanger 24 is emptied.

As the gravity feed hanger system has been described, the apparatus and method of the instant invention will be described in reference to a gravity feed hanger system. It should be noted that while the invention is described in reference to a gravity feed hanger, the invention is not so limited as the invention may be suitably used in any self-adjusting shelf.

Figure 5:
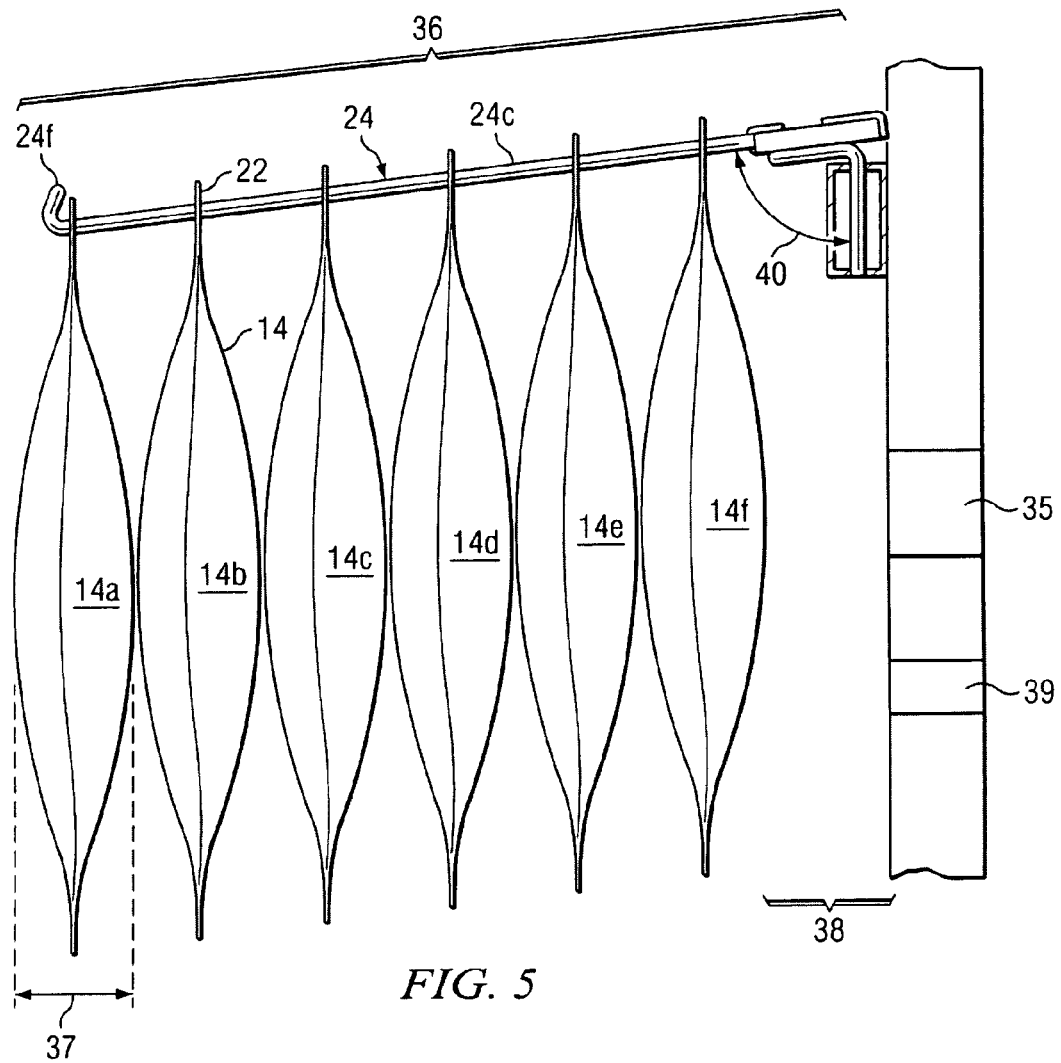
FIG. 5 is a side profile view of one embodiment utilizing a sensor and a bar code scanner.

FIG. 5 is a side profile view of one embodiment utilizing a sensor and a Stock Keeping Unit (SKU) reader. As previously described, the gravity feed hanger system 10 employs gravity to allow the package 14 to fall to the lip of the hanger 24*f*. Put differently, gravity forces the packages 14 to achieve the greatest possible distance away from the back end of the gravity feed hanger system 10. The front end, as used herein, refers to the face of the shelf wherefrom product is retrieved. The back end of the shelf, as used herein, refers to the side of the shelf opposing the front end. Thus, the back end of the shelf is the end furthest from the consumer retrieving product from the front end. Referring back to FIG. 5, if the distance between the last product 14*f* (the product closest to the back wall of the gravity feed system 10) and the back end of the shelf is known, the total length 36 of the hanger 24 is known, and the thickness of the package 14 is known, then the number of packages 14 on the hanger 24 can be calculated.

The distance from the back of the shelf to the last product 14*f* can be measured by a multitude of methods. One method ideally suited for the instant invention is utilizing a sensor 35, as shown in FIG. 5. FIG. 5 also shows the total length 36 of the hanger 24, the thickness 37 of one package 14, and the gap distance 38 defined as the distance between the sensor 35 and the last package 14*f*. In some embodiments, the total length 36 of the hanger 24 is greater than about 400 mm. In other embodiments, the initial gap distance 38 is less than about 100 mm. The sensor, which is discussed in detail below, measures the gap distance 38. If the leading package 14*a* (the package farthest away from the back wall of the gravity feed system 10) is removed, the second leading package 14*b* is pulled downward via gravity and the second leading package 14*b* then becomes the leading package. The remaining packages 14*c*-14*e* and the last package 14*f* are likewise pulled downward via gravity and also slide down the hanger 14. The sensor 35 now reads a greater distance which corresponds approximately to the sum of the initial gap distance 38 and the thickness of the leading package 14*a*. Based on the new gap distance 38, the number of packages 14 on the hanger 24 can be calculated by methods known in the art. In FIG. 5, if the leading package 14*a* is removed, the sensor 35 will measure the new gap distance 38, and the resulting calculation will show five packages remaining on the hanger. Those skilled in the art will appreciate that depending on the sensor selected the sensor may need to be calibrated to obtain accurate and consistent package counts.

There are a variety of sensors which may be successfully employed to measure distance. A sensor, as used herein, refers to any device which determines a distance and converts it into a signal which can be read by an observer or by an instrument. Thus, suitable sensors include, but are not limited to, electronic sensors which electronically measure a distance, optical imaging sensors, lasers, and ultrasonic sensors. Suitable sensors may utilize any method known in the art for measuring and determining a distance. For example, the sensors may use the time of flight method or a method whereby the focal length of a lens is adjusted to determine distance. Thus, in one embodiment the sensor is a camera capable of determining a distance.

Furthermore, both digital and analog sensors may be suitably utilized. In one embodiment, Applicants have found DT-10, a photo-electric analog sensor made by SICK AG of Waldkirch, Germany to be suitable. In other embodiments, Applicants have found PZ-M73, a photo-electric digital sensor made by Keyence Corporation of America of Woodcliff, N.J. to be suitable.

The sensor preferred for a given embodiment is highly dependent upon a multitude of factors including cost, distance, material type, geometry of the package, accuracy needed, etc. Those skilled in the art armed with the disclosure of the instant invention will be able to select an optimum sensor for a given embodiment. For example, in one test for one embodiment, it was determined that in general ultra-sonic sensors yield great accuracy but only for distances over 150 mm. As the gap distance in many embodiments is less than about 150 mm, certain ultra-sonic sensors are unsuitable for the instant invention. Other sensors such as laser sensors are suitable but are traditionally more expensive than the photo-electric sensors. All relevant factors must be weighed and considered when selecting the optimum sensor.

The strength and accuracy needed for a sensor, one factor to consider when selecting an appropriate sensor, is dependent on a variety of factors including the total length of the hanger 24 or shelf employed. For example, in one embodiment, the sensor may need only to read distances as far as the total length of the hanger. In some embodiments sensors may need to be able to measure distances much smaller than the total length of the hanger, for example, distances that correlate to the initial gap distance. Those skilled in the art will be able to determine which sensors are suitable for the ranges desired.

The package material also affects the type of sensor selected. An appropriate sensor can be selected for virtually any material including, but not limited to, metallic films, matte films, cardboard, plastic, paper, and other composite films. These different materials pose varying problems which must be addressed in the sensor selection. For example, the metallic films are more reflective than matte films; however, Applicants have found the aforementioned SICK DT-10 photo-electric sensor to be well suited for both matte film and metallic film packages.

The package 14 geometry also affects the type of sensor selected. For example, thinner packages require a more accurate sensor than what would be needed for use with thicker packages. Applicants believe that those skilled in the art, armed with the disclosure of the instant invention, will be able to select an appropriate sensor for their particular embodiment.

The same factors which affect the sensor selection also affect the sensor positioning. For example, if the package is rectangular then the sensor placement along the length of the package has little effect on the measurement. However, it has been found that in some package geometries, specifically, standard flex packages which often do not have a uniform cross section or thickness, a more accurate gap measurement results if the sensor is aligned with the thickest part of the package. To that end, in some embodiments it is preferable that the pitch of the sensor 35 match the angle 40 of the hanger. Accordingly, in some embodiments it is preferable that the sensor 35 be adjustable both in pitch and lateral placement so that optimal placement may be achieved. Put differently, in some embodiments the sensor 35 is positioned so that it may be raised or lowered vertically, moved horizontally, and angled at a pitch to obtain more accurate measurements. As depicted, the sensor 35 is located flush with the display apparatus 12. However, the sensor 35 can be located in a variety of positions including atop the display apparatus 12 or atop or flush with the cross beam 18. Further, in some embodiments an adjustable mount is provided which supports the sensor 35 in the desired location behind the package 14. The location of the sensor is not critical to the operation of the instant invention, and those skilled in the art armed with the instant disclosure will appreciate that varying placement of the sensor may alter the necessary calibration.

In another embodiment a single sensor is employed to measure the distance for at least two hangers 24. In one such embodiment, the sensor 35 is positioned on a track whereby it may travel horizontally, vertically, diagonally, or a combination of all three to act as a sensor for at least two hangers. Those skilled in the art will appreciate the different methods of positioning a sensor 35 to achieve the desired result of measuring the distances associated with at least two hangers with one sensor.

In some embodiments the sensors have additional capabilities aside from the ability to measure distances. For example, in one embodiment the sensors comprise a "tracking ability." A sensor with such an ability communicates information regarding the measured distance as well as its physical location, for example, within a store. For example, the sensors can be in communication with a wireless card or antennae which can use a variety of methods, such as triangulation, to determine its location. Additionally, the sensor can be equipped with Global Positioning System (GPS) technology or other equivalent technology known in the art. It should be noted that the tracking ability, and the necessary technology, is not limited to being located on the sensor. The shelf or product support, as well as the harvesting device or Stock Keeping Unit reader, both discussed below herein, can all comprise the tracking ability and the necessary technology. For example, rather than the sensor being connected to GPS technology, the shelf itself is attached to the GPS technology. The ability to track a shelf's location, within a store, for example, allows the retailer to strategically position certain products throughout a store and along a shelf. Those skilled in the art armed with the instant disclosure will appreciate the various means for providing the sensor with a tracking ability.

Regarding the determination of the product type and ultimately package thickness, there are a variety of methods to ascertain the thickness of the package 14. In one embodiment the thicknesses of packages with similar products is averaged to determine a standard assumed thickness for that specific package. This standard thickness is then input into a computer in communication with the sensors and is stored. As used herein "communication" includes physical communication via wires as well as wireless communication both directly and through intervening devices. Thus, once the data from the sensor 35 is received, the computer ascertains the thickness of the specific package 14 from a database for example, and can then calculate the number of packages 14 remaining on the corresponding hanger. Thus, the retail store and whoever else has access to the data will know exactly how much product is needed to replenish a specific hanger.

In another embodiment the apparatus comprises the ability to identify the product and package type. This gives the apparatus the ability to determine, for example, the package thickness for a given package without the need for manually inputting a known or averaged product thickness to correspond to a specific shelf This has a benefit in that a specific product is not limited to a specific shelf Accordingly, a product which comprises a certain package thickness can be removed from a hanger and replaced with a product comprising a different package thickness and the apparatus will automatically recognize the new product and its associated new thickness. In one embodiment the average thicknesses for all products is entered into a computer or other like device, and the computer utilizes the identified package and its stored associated average thickness to calculate the number of packages on a shelf.

In one embodiment the product is identified by its Stock Keeping Unit (SKU) identifier. Packages generally have unique SKU's which identify the type of product, an example of which is a bar code. Another example of an SKU is a "colored dot" scheme typically employed to identify the color scheme on a package. Unique selection and orientation of these colored dots provides a unique SKU. Finally, a unique image or set of characters located on a package also serves as an SKU.

In one embodiment the apparatus further comprises an SKU reader. An SKU reader refers to any device which can scan or otherwise recognize an SKU. Thus, an SKU reader includes, but is not limited to, a bar code scanner, and a camera.

The location of an SKU reader 39 in one embodiment is illustrated in FIG. 5. As with the sensors previously addressed, there are a variety of factors which affect the selection of an appropriate SKU reader. Regarding range, a preferred SKU reader 39 should have the ability to read at distances as far as the length 36 of the hanger 24 or further and as near as the gap distance 38. Furthermore, as with the sensors, the package material and geometry also affects the selection of the SKU reader. Applicants believe that those skilled in the art armed with the instant disclosure will be able to select an appropriate SKU reader to employ in a given embodiment.

As with the sensors, the location of the SKU reader is one factor which must be considered. The product SKU can be located in a variety of places on a package. Accordingly, the SKU reader is located to allow the reader to correctly read the SKU. In a preferred embodiment, the SKU reader is horizontally and vertically adjustable relative to the shelf to allow for more accurate positioning. Thus if a new package which has an SKU on the bottom-left of the package is replaced with a package which has an SKU on the bottom-right, the reader can be adjusted laterally to read the SKU on the new package. Further, in one embodiment the pitch of the SKU reader is adjustable to allow the SKU reader to follow the angle 40 of the product supports. Finally, in one embodiment the SKU reader is moveable along the shelf so that one SKU reader has the ability to read the SKU associated with packages located on two or more different hangers or shelves.

The apparatus in FIG. 5 has the ability to measure the distance between the sensor 35 and the last package 14*f*. Furthermore, the SKU reader 39 can recognize the last package 14*f* and accordingly ascertain its thickness, for example, by retrieving the thickness from a database. With this information, the computer or other like device can calculate the number of packages on the hanger as well as identify the type of product in each package.

Another method for identifying a package or product type, and thus ascertaining the package thickness is utilizing Optical Character Recognition (OCR). OCR is a process in which software reads text and/or characters in an image. The software is trained to identify and recognize varying text and/or characters and can accordingly categorize and differentiate between varying packages. OCR software combined with hardware such as a camera mounted so as to capture an image of the package yields a method for identifying the package and product type.

Figure 6:
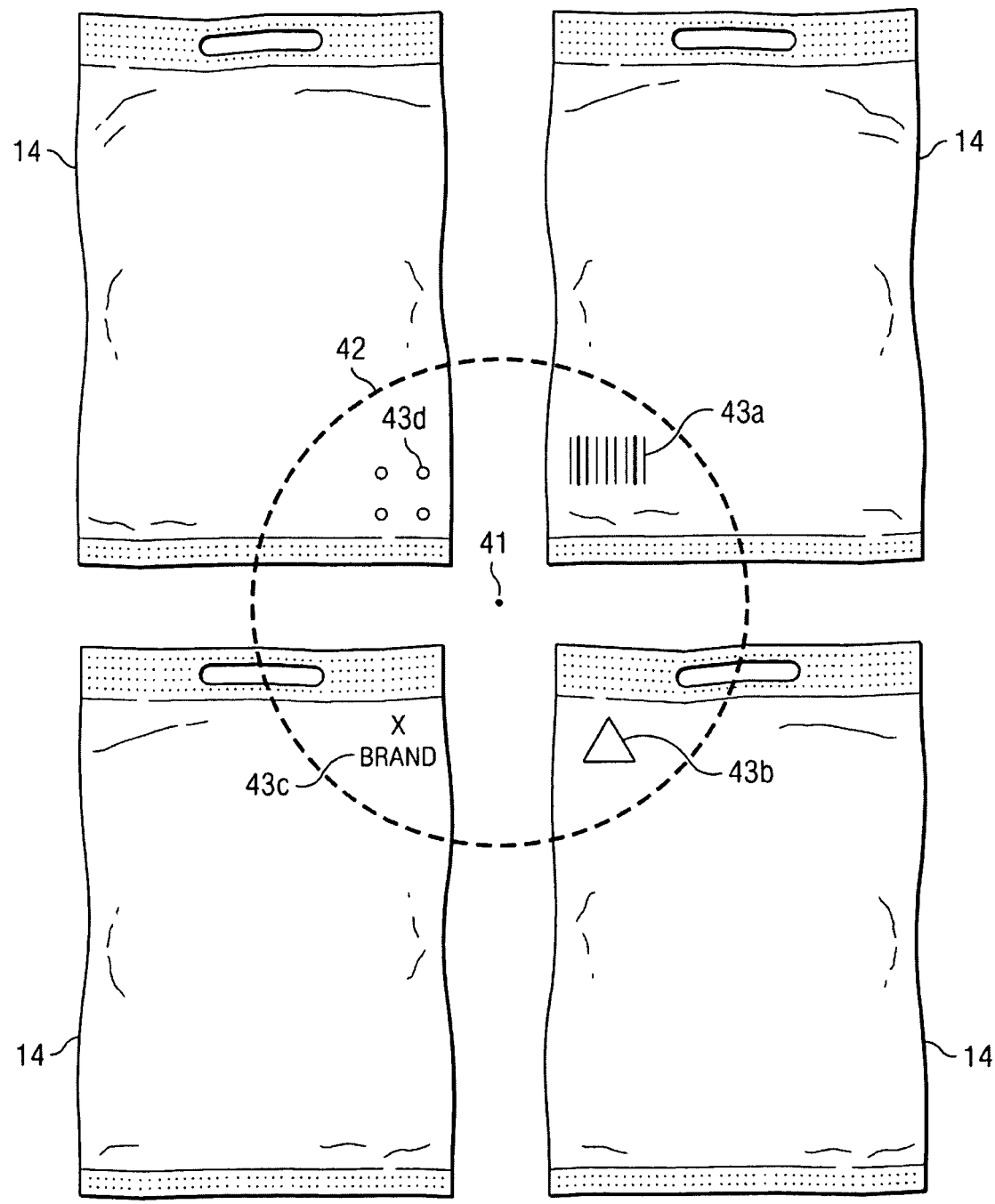
FIG. 6 is a back profile view of one embodiment utilizing a camera.

FIG. 6 is a back profile view of one embodiment utilizing a camera. In the embodiment shown, the camera is mounted on the back of the shelf so that it faces the backside of the packages. As with the sensor and the SKU reader, both previously described, the camera 41 can be mounted on the display apparatus, the crossbeam, or a separate mounting apparatus. Further, in some embodiments the camera 41 can be advantageously located in front of the shelf so that the front image of the package is captured. In the embodiment shown the camera 41 is positioned to be able to capture SKU's 43*a-d* from four adjacent packages. FIG. 6 illustrates four possible SKU's including a bar code 34*a*, a unique image 43*b*, a unique colored dot scheme 43*c*, and a unique character set 43*d*. Thus, the camera, in conjunction with the OCR software can recognize from its SKU 43*d* that the top left package comprises a certain product and has a specific thickness. In one embodiment, the software matches the image of the SKU 43*d* with an image stored on a database. Simultaneously, the camera 41 can identify the product type and thickness of the top right package by its SKU 43*a*. Although the camera 41 depicted in FIG. 6 is positioned to be able to recognize four packages, in other embodiments it may be desirable to only recognize one or two packages. Thus, utilizing the OCR method allows the apparatus to distinguish between two brands of snack food, for example, sitting adjacent on a shelf. The ability to identify a package with OCR, which results in ascertaining the thickness of the identified product, coupled with the measured distance allows the number of packages on a shelf or hanger to be calculated.

As discussed previously, a camera can be utilized as a sensor to determine a distance. Further, as discussed above, a camera in conjunction with OCR technology can be used to recognize a product's SKU and accordingly a product type. Thus, in one embodiment a single device measures the distance from a sensor and a package closest to a back end of the shelf and ascertains the thickness of the package by identifying the package SKU.

In one embodiment, once the data is measured and collected from the sensor and/or the SKU reader or any other identifying or counting means, it is then harvested into a harvesting device. As used herein "data" refers to any information which may be retrieved from the shelf including, for example, number and type of products on the hanger, number and type of products on the entire shelf and in the entire store, location of each product, the date and time each product was removed from the shelf, etc. In one embodiment the harvesting device, which harvests data from at least one sensor, comprises a Programmable Logic Control (PLC). Harvesting devices, in some embodiments have the ability to harvest as well as utilize the data, by, for example, performing calculations. Thus, in some embodiments the harvesting devices calculate the desired output, specifically the number and perhaps type of packages on a shelf as well as their location, from the collected data. Those skilled in the art armed with the instant disclosure will appreciate various methods and devices which can be used to calculate the desired output from the collected and/or input data.

The data can be transferred via Ethernet cables, or alternatively, the data can be transferred wirelessly through a wireless network. In another embodiment the data is harvested in a personal computer, and in another embodiment the data is harvested in a smart phone. Those skilled in the art will appreciate the different harvesting devices which can be utilized to achieve the desired goal. Each of these devices allows data to be compiled, stored, and transferred to other devices such as a handheld device. Thus, a stocker can retrieve the data from the harvesting device via a smart phone and know which and how much of each product must be restocked.

In another embodiment, once data is collected by the harvesting device, the data is triangulated with other data to produce more accurate data. For example, even if the amount and type of product located on a shelf is known, that data may not always adequately predict the amount and type of product located within a store. This difference can arise when a consumer removes a package from one shelf, decides they do not want to purchase the product and places the package elsewhere in the store. If the store were relying solely on data collected from the shelves then that data could indicate that the store has less product than it actually does. However, the harvesting device or other devices downstream of the harvesting device can be triangulated with other data such as data retrieved from the point of sale register. The point of sale data can indicate that the package removed from the shelf has not yet been purchased. Thus, in the above scenario, the data collected from the harvesting device is merged with the data collected at the point of sale register to determine an accurate inventory. Another example of data which may be triangulated or reconciled is data compiled from the store receiving end. Retail stores typically receive and inventory product in a receiving end of the store before stocking the product. Additionally, damaged and/or expired product is occasionally returned to the manufacturer from such a receiving end. Thus, an accurate amount of inventory in a store can be determined by reconciling the data received from the receiving end, which can include both incoming and outgoing product, the data received from the point of sale, as well as the data received from the apparatus of the instant invention. Those skilled in the art armed with the instant disclosure will appreciate other types of data to triangulate as well as the method of triangulating the data.

The sensors and harvesting devices generally require power to operate. Thus, in one embodiment the sensors and/or the harvesting devices are connected to an electrical outlet. In another embodiment, the sensors and/or the harvesting devices are connected to a remote power source such as a battery or solar device, which can operate without being connected to an electrical outlet. Those skilled in the art armed with the instant disclosure will appreciate other such remote power sources which can be utilized in conjunction with the instant invention. Using such a remote power source allows the shelves to be easily repositioned without need for the shelf to be located in close proximity to an electrical outlet.

Thus, in one embodiment a method for monitoring inventory is disclosed using a self-adjusting shelf which has at least one product support having sufficient capacity for a plurality of packages and having at least one package, wherein the distance from a sensor located on the shelf and the package closest to the back end of the shelf is measured, the thickness of the package closest to the back end of the shelf is ascertained, and the number of packages remaining on the shelf is calculated. In one embodiment, the apparatus for storing a monitoring inventory includes a self-adjusting shelf with at least one product support, and at least one sensor which can measure distances.

The instant invention allows for more efficient and effective restocking and inventory monitoring. Aside from increased efficiencies, such real time data has other benefits as well. For example, the manufacturer will instantly know the consumer preferences for a variety of flavor possibilities. Furthermore, the manufacturer will be able to track the shelf date, or the time which specific package 14 has been on the shelf. For example, if the distance for a specific hanger 14 remains unchanged for three months, then the manufacturer knows the product on that hanger has been sitting on the shelf for three months as well. Such information would inform the manufacturer that perhaps that product is not selling well, or perhaps that there is too much shelf space dedicated to that product and that another product should take its shelf place. Such information in undoubtedly beneficial to the manufacturer for a multitude of reasons.

Furthermore, while the invention has been described with regard to a retail store, the invention is not so limited. For example, the apparatus and method of the instant invention can be used in a warehouse to monitor inventory. Further, the instant invention can be applied to industrial applications for monitoring inventory manufacturing parts. Taken further, as the instant invention can provide real time data, an apparatus of the instant invention can be integrated into a manufacturing process wherein subsequent steps of a manufacturing process cannot begin until it is verified that the prior step utilized all the required parts. As an example, before a final manufactured product is painted or shipped, the method and apparatus of the instant invention can verify by monitoring inventory that all the necessary parts have been used, and thus the necessary manufacturing steps have been completed. This can result in increased efficiency and increased product quality.

While the invention has been particularly shown and described with reference to a preferred embodiment, it will be understood by those skilled in the art that various changes in form and detail may be made therein without departing from the spirit and scope of the invention.

We claim:

1. A method for monitoring inventory on a self-adjusting shelf, said shelf comprising at least one product support comprising capacity for a plurality of packages and comprising at least one package, said method comprising:

using a sensor to measure the distance between said sensor and a package closest to a back end of said shelf;

ascertaining the thickness of said package by consulting a database; and calculating the number of packages on said shelf with a computer.

2. The method of claim 1 wherein said ascertaining comprises inputting the thickness into a computer in communication with said sensor.

3. The method of claim 1 wherein said ascertaining comprises identifying the product type.

4. The method of claim 3 wherein said identifying comprises reading a package Stock Keeping Unit.

5. The method of claim 3 wherein a single device measures said distance and identifies the product type.

6. The method of claim 3 wherein said Stock Keeping Unit comprises a bar code.

7. The method of claim 1 further comprising relaying data collected by said measuring and ascertaining to a harvesting device.

8. The method of claim 7 wherein said harvesting device is a Programmable Logic Controller.

9. The method of claim 7 wherein said harvesting device is a personal computer.

10. The method of claim 7 wherein said harvesting device is in communication with a network.

11. The method of claim 7 wherein both of said sensor and said harvesting device are in communication via a wireless network.

12. The method of claim 1 wherein said ascertaining is accomplished by utilizing Optical Character Recognition software and hardware.

13. The method of claim 12 wherein said hardware comprises a camera.

14. The method of claim 1 wherein said packages are pillow pouch bags.

15. The method of claim 1 wherein said self-adjusting shelf is a gravity feed system.

16. An apparatus for storing and monitoring inventory comprising:

a self-adjusting shelf comprising at least one product support, wherein said product support is capable of supporting a plurality of packages; and at least one sensor located on said shelf, wherein said sensor is capable of measuring distances between said sensor and an object on said at least one product support.

17. The apparatus of claim 16 wherein said self-adjusting shelf comprises a plurality of product supports.

18. The apparatus of claim 16 wherein said self-adjusting shelf comprises a gravity feed hanger system.

19. The apparatus of claim 18 wherein said gravity feed hanger system comprises at least one hanger, said hanger being sloped at an angle less than 90°.

20. The apparatus of claim 18 wherein said gravity feed hanger system comprises a plurality of hangers and wherein each of said plurality of hangers comprises a sensor.

21. The apparatus of claim 16 wherein said apparatus comprise a tracking ability.

22. The apparatus of claim 16 wherein said sensor is in communication with a harvesting device.

23. The apparatus of claim 22 wherein said sensor and said harvesting device are in communication via a wireless network.

24. The apparatus of claim 22 wherein said harvesting device harvests data relating to shelf location.

25. The apparatus of claim 16 wherein said sensor has an adjustable pitch.

26. The apparatus of claim 16 wherein said sensor is adjustable laterally relative to said shelf.

27. The apparatus of claim 16 wherein said shelf comprises at least two product supports, and further wherein at least one of said at least one sensor is capable of moving laterally relative to said shelf such that one sensor is capable of measuring distances associated with two or more product supports.

28. The apparatus of claim 16 further comprising means of identifying a product type.

29. The apparatus of claim 28 wherein said means of identifying a package type comprises at least one Stock Keeper Unit reader.

30. The apparatus of claim 29 wherein said shelf comprises at least two product supports, and further wherein at least one of said at least one Stock Keeper Unit reader is capable of moving laterally relative to said shelf such that one Stock Keeper Unit reader is capable of reading a Stock Keeper Unit associated with packages located on two or more product supports.

31. The apparatus of claim 28 wherein said means of identifying a package comprises Optical Character Recognition software and hardware.

32. The apparatus of claim 28 wherein a single device is capable of measuring distances and identifying a package.

33. The apparatus of claim 16 further comprising a remote power source.

34. The apparatus of claim 16 wherein said sensor is selected from the group consisting of electronic sensors, optical imaging sensors, lasers, digital sensor, analog sensor, camera, and ultrasonic sensors.

35. The method claim 1 wherein said sensor is selected from the group consisting of electronic sensors, optical imaging sensors, lasers, digital sensor, analog sensor, camera, and ultrasonic sensors.

* * * * *